UNITED STATES PATENT OFFICE.

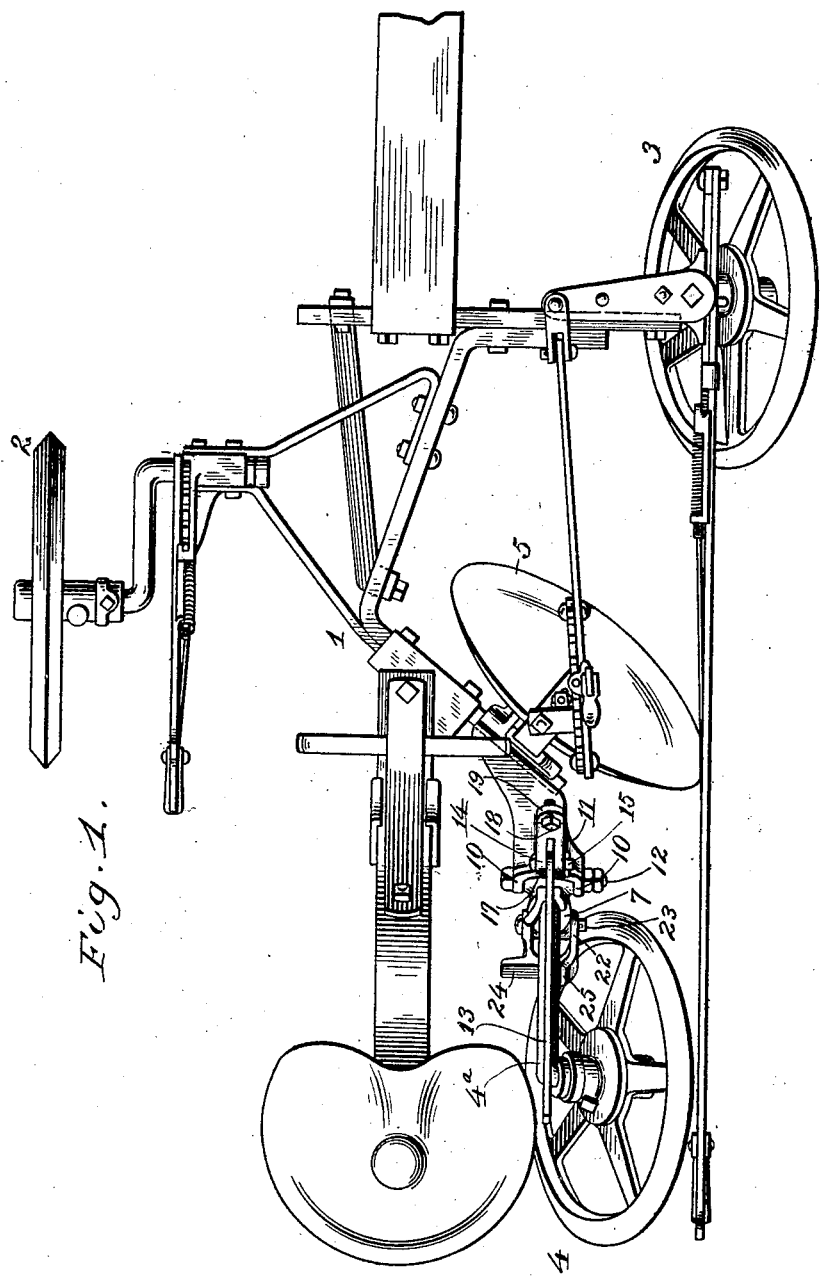

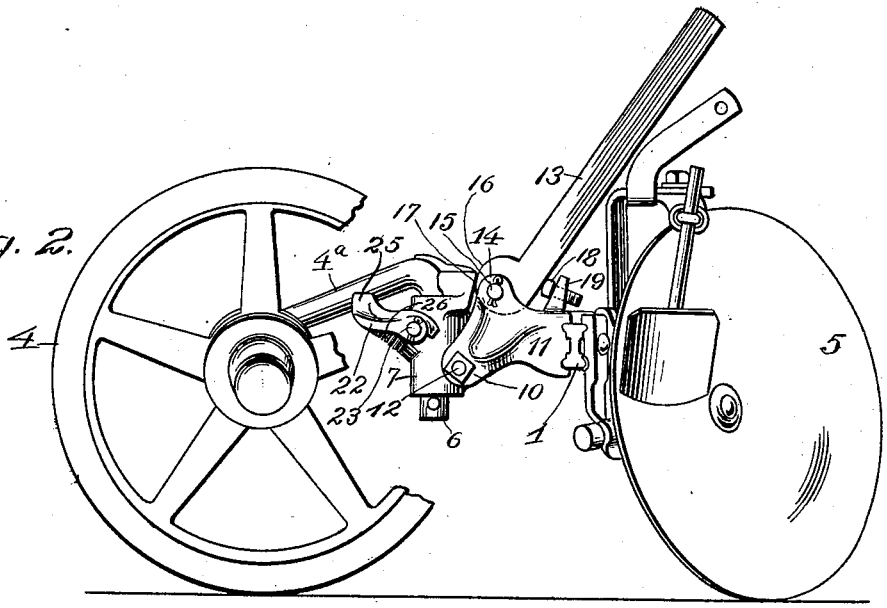
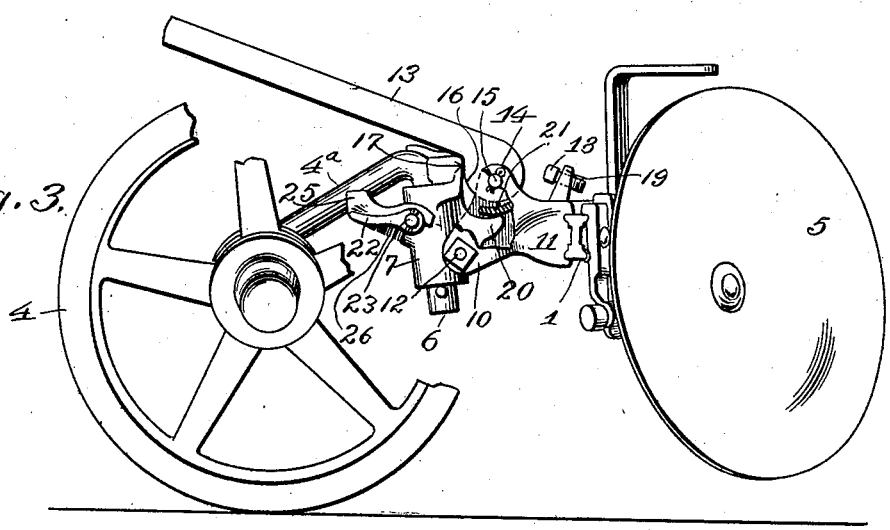

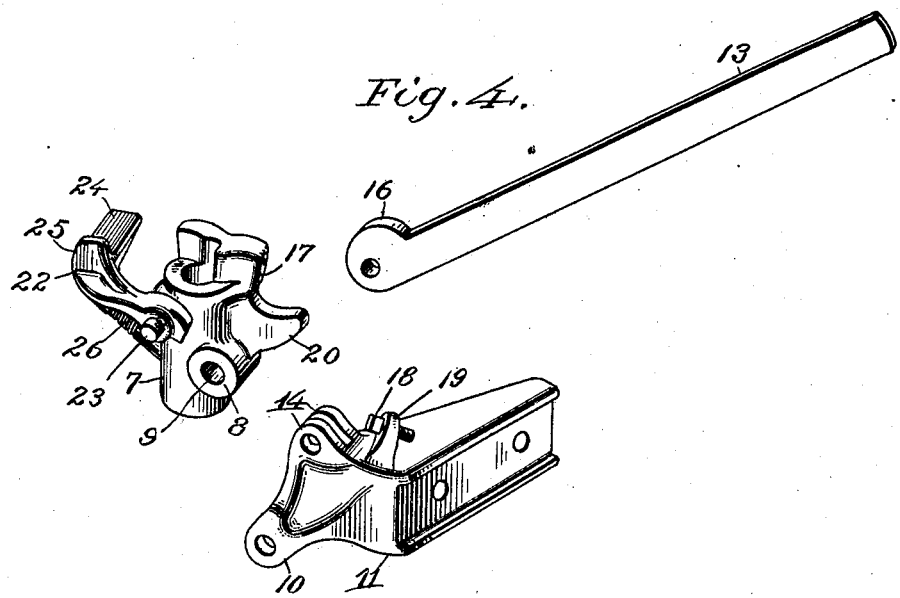

HARRY S. DICKINSON, OF MOLINE, ILLINOIS, ASSIGNOR TO MOLINE PLOW COMPANY, A CORPORATION OF ILLINOIS.

WHEELED PLOW.

1,318,978.  Specification of Letters Patent.  Patented Oct. 14, 1919.

Original application filed December 17, 1915, Serial No. 67,338. Divided and this application filed September 1, 1917. Serial No. 189,268.

*To all whom it may concern:*

Be it known that I, HARRY S. DICKINSON, a citizen of the United States, residing at Moline, in the county of Rock Island and State of Illinois, have invented certain new and useful Improvements in Wheeled Plows, of which the following is a specification, reference being had therein to the accompanying drawing, being a division of original application filed December 17th, 1915, Ser. No. 67,338.

This invention relates to agricultural implements and is shown by way of example embodied in a single disk plow, the frame of which is supported at one side by a land wheel and at the other side by a front furrow wheel and a rear trailing furrow wheel, the invention consisting of an improved mounting for the rear trailing furrow wheel by which the frame of the machine may be raised and lowered to correspondingly raise and lower the plowing device, the invention consisting also of means for controlling the lateral swing of the rear furrow wheel.

In the accompanying drawings:

Figure 1 is a top plan view of a wheeled plow having my invention embodied therein.

Fig. 2 is a side elevation of the rear portion of the same showing the rear wheel raised and the frame lowered with the disk in action.

Fig. 3 is a similar view showing the rear wheel lowered and the frame raised with the disk out of action.

Fig. 4 is a perspective view of the details of the furrow wheel mounting, with the parts separated from each other.

Referring to the drawings:

The plow shown in the accompanying drawings and illustrating by way of example one form of embodiment of my improvements, consists of a frame structure 1 supported at the land side by a land wheel 2 and at the furrow side by a front guiding furrow wheel 3 and a rear trailing furrow wheel 4, the frame giving support to a plowing device in the form of a disk 5, and giving support also to a driver's seat.

The rear trailing furrow wheel 4 is mounted on the downwardly inclined end of a wheel support in the form of a forwardly extending stem $4^a$, the forward end of which is bent downwardly in the form of a vertical journal 6. The journal is mounted loosely in a vertical bearing in a bearing member in the form of a block 7 having formed on its forward side a lug 8 provided with a horizontal bolt hole 9. The lug extends between two ears 10 extending rearwardly from a casting or head 11 firmly bolted or otherwise connected with the frame 1 of the machine and constituting in effect a fixed part thereof or frame member, a pivot bolt 12 being passed through openings in the ears 10 and through the hole 9 in the bearing block, and forming a pivotal connection between the bearing block and the frame of the machine. As a result of this construction, the wheel 4 may swing laterally relatively to the frame, due to the pivotal motion of the journal 6 in the bearing block, and may also be moved bodily up and down relatively to the frame, due to the pivotal mounting of the bearing block on the frame member. I propose to utilize the bodily up and down movements of the wheel, for raising and lowering the machine frame to elevate the plowing device out of action and its lowering into action, and to effect these operations I provide a hand lever 13 which is pivoted at its inner end between upstanding ears 14 on the frame member by means of a horizontal pivot bolt 15 which extends through said ears and through a hole in the lever. This lever at its inner end is formed with a cam surface 16, which surface extends eccentrically relatively to the pivotal axis of the lever, and which surface engages the upper end of the bearing block 7 at its forward side as at 17. The relation of the parts is such that when the lever is in a forward position, as shown in Fig. 2, the low portion of the cam surface will be in engagement with the bearing block and the latter will be sustained in a nearly upright position, with the furrow wheel in its elevated position, and with the frame in its lowered position and the disk in action. When now the lever is swung to the rear to the position shown in Fig. 3, the high part of the cam will engage the bearing block and will rock the latter rearwardly and downwardly on its axis and will correspondingly lower the wheel, which action will elevate the frame of the machine and raise the disk out of action. The relation of the point of engagement of the cam surface with the surface 17 on the bearing block, to the axis of the lever is such that when the lever is in its rear position with the frame elevated, the lever will be locked so that the frame will be held elevated without the use of extraneous locking latches or other means usually employed for such purposes. In the movement of the lever from the rear position shown in Fig. 3 to the forward position shown in Fig. 2, the bearing block is held in contact with the cam by the weight of the machine frame and parts supported thereby acting through the pivot bolt 12, and the final forward position of the lever will therefore determine the extent of upward motion of the wheel and the correseponding extent of downward motion of the frame and the depth to which the plowing device will descend and be maintained. The relation of the rear wheel with respect to the position of the plowing disk when the plow is at work is very important, for it is well known that upon the rear wheel much of the control of a disk plow depends. If the wheel is set a little too low, the disk will not bear properly in the ground, or if the wheel is set a little too high, the disk will bear too much in the ground, these conditions being especially true of a multiple disk plow, where it is particularly desirable that the front and rear disks should run at an equal depth. I propose to control the relation between the rear wheel and the disk when the latter is in action, by means of a stop device on the frame in position to be engaged by the lever 13 when the latter is swung forwardly, and acting to limit the forward motion of the lever, and consequently the depth to which the disk will be lowered. In the present instance this stop device is in the form of a screw 18, threaded in a vertical lug 19 extending upwardly from the frame member or head 11, the head of the screw being in position to be engaged by the forward edge of the lever. By setting this screw in different positions axially in the lug, the lever may be arrested at different points in its forward throw, so as to correspondingly vary the depth to which the disk will be lowered in action. By means of a stop device of this character, the relation of the parts may be established with extreme degree of fineness, which would not be possible with the use of adjusting mechanisms embodying ratchet and similar toothed holding devices, such as have heretofore been employed. My improved adjusting device is especially serviceable in connection with plows of the disk type, although it is manifest that it could be employed also to great advantage in plows of the moldboard type, where the conditions might be such as to require a set of the rear wheel in relation to the land side of the plow, in the furrow of which the rear wheel is frequently run.

In the position of the parts shown in Fig. 3, where the plow is raised out of action, unless means are provided to prevent it, the bearing block 7 and wheel carried thereby may rock downwardly on its axis, in which action the bearing surface 17 on the member will disengage the cam surface on the lever. Such action of the parts might occur, for instance, when the wheel in turning, moves to the extreme right or left, the result being that the wheel would turn down on its side and possibly up-set the machine. To avoid this possibility, I provide a stop device, which when the bearing block is rocked downwardly by the lever, will prevent the further pivotal downward movement of the block. This stop device in the present instance consists of a lug 20 projecting forwardly from the forward side of the block between the ears 10 on the frame member, and which lug when the bearing block is rocked downwardly by the lever is adapted at the end of its downward movement to engage a stop lug 21 fixed to the frame member 11, and extending rearwardly between the ears 10 thereon. As a result, the wheel in its position of adjustment as shown in Fig. 3, will be prevented from swinging further downwardly.

In the use of plows of the type under consideration, and in plows of other types, where a rear trailing furrow wheel is employed, there is often a tendency for the plow to swing out of line, and to prevent this action, it is necessary to limit the lateral swing of the wheel in a furrowward direction. To effect this I provide a latch device 22, which is adapted to coöperate with the forwardly extending wheel carrying stem in such manner that its lateral motion will be checked at a predetermined point. This latch device is pivoted at its forward end to the rear side of the bearing block by means of a horizontal pivot bolt 23, so that the latch may be swung up and down into and out of action, and it is provided with a horizontally extending bearing surface 24 adapted to bear against the under side of the stem 4$^a$ and is provided also with an upwardly extending stop lug 25 at the end of said bearing surface, which stop lug, when the bearing surface engages with the stem, will extend in the path of movement of the stem and will limit said movement in one direction. The latch is held yieldingly in engagement wth the wheel stem in operative relation thereto, by means of a spiral spring 26 bearing between the bearing block and a shoulder on the latch. The bearing surface 24 forms in effect a foot pad by means of which the operator may press the latch down and release the wheel stem from the limiting action thereof. This release of the wheel is desirable in plowing in a curve to the right in order to enable the plow to follow in the curve. Also it is desirable when turning the machine at the ends of the furrows or in transporting the same. In the present instance the plow throws the furrows to the right, and therefore the stop is at the right hand end of the latch so as to limit the swing of the wheel in a furrowward direction. In the case of a plow throwing the furrow to the left, of course the stop would be oppositely arranged accordingly. It will be noted in the construction described that the wheel stem extends forwardly at an upward inclination and enters the bearing block at the top and that the latch acts on the under side of the stem from below. This arrangement of the stem gives much more clearance beneath the machine for trash, than there would be if the stem entered the bearing block from beneath. Also it enables the latch to be sustained in a more convenient position for manipulation by the operator.

While in the accompanying drawings and foregoing description I have set forth my invention in the particular form and detailed construction which I prefer to adopt, it will be understood that these details may be variously changed and modified without departing from the spirit of my invention, and further it will be understood that the invention is not limited to any partcular form or construction of the parts except in so far as such limitations are specified in the claims.

Having thus described my invention, what I claim is:

1. In a plow, the combination of a frame, a ground wheel, a support for the wheel on which it is mounted, a member sustaining the support and pivotally mounted on the frame to rock on a horizontal axis to raise and lower the frame, means for moving the said member on its axis to raise the frame, and a stop on the frame in position to be engaged by the rocking member to limit its rocking motion in raising the frame.

2. In a plow, the combnation of a frame, a ground wheel, a support for the wheel on which it is mounted, a member sustaining the support and mounted on the frame to rock on a horizontal axis to raise and lower the frame, a hand lever on the frame adapted when swung in one direction to rock the member down and elevate the frame, and a stop on the frame in position to be engaged by the rocking member to limit its downward motion.

3. In a plow, the combination of a frame, a ground wheel, a support for the same on which the wheel is mounted, a member sustaining the support and mounted on the frame to rock on a horizontal axis to raise and lower the frame, a hand lever on the frame provided with a cam surface engaging the rocking member, said lever adapted when swung in one direction to rock the member downwardly and elevate the frame, and a stop on the frame in position to be engaged by the rocking member to limit its downward motion.

4. In a plow, the combination of a frame, a ground wheel, a support for the same including a fore and aft arm sustained by the frame to swing laterally to angle the wheel, a latch movably sustained by the frame and bearing against the under side of the arm, said latch having a stop lug to limit the lateral swing of the arm, a spring acting on the latch to hold it yieldingly in engagement with the arm, and a foot pad on the latch for operating it to free the arm.

In testimony whereof, I have affixed my signature.

HARRY S. DICKINSON.

Copies of this patent may be obtained for five cents each, by addressing the "Commissioner of Patents, Washington, D. C."